(12) United States Patent
Guha

(10) Patent No.: US 9,718,932 B2
(45) Date of Patent: Aug. 1, 2017

(54) OVERMOLDING WITH NON-ORIENTED FIBERS

(71) Applicant: CONTINENTAL STRUCTURAL PLASTICS, INC., Auburn Hills, MI (US)

(72) Inventor: Probir Kumar Guha, Bloomfield Hills, MI (US)

(73) Assignee: CONTINENTAL STRUCTURAL PLASTICS, INC., Auburn Hills, MI (US)

( * ) Notice: Subject to any disclaimer, the term of this patent is extended or adjusted under 35 U.S.C. 154(b) by 0 days.

(21) Appl. No.: 14/914,863

(22) PCT Filed: Sep. 2, 2014

(86) PCT No.: PCT/US2014/053710
§ 371 (c)(1),
(2) Date: Feb. 26, 2016

(87) PCT Pub. No.: WO2015/031893
PCT Pub. Date: Mar. 5, 2015

(65) Prior Publication Data
US 2016/0208061 A1    Jul. 21, 2016

Related U.S. Application Data

(60) Provisional application No. 61/872,059, filed on Aug. 30, 2013.

(51) Int. Cl.
*C08J 5/04*    (2006.01)

(52) U.S. Cl.
CPC ............ *C08J 5/048* (2013.01); *C08J 2300/22* (2013.01); *C08J 2401/02* (2013.01)

(58) Field of Classification Search
CPC ..... C08J 5/048; C08J 2401/02; C08J 2300/22
See application file for complete search history.

(56) References Cited

U.S. PATENT DOCUMENTS

| | | |
|---|---|---|
| 3,063,883 A | 11/1962 | Brissette |
| 3,288,707 A | 11/1966 | Hurwitz |
| 4,474,846 A | 10/1984 | Doerer et al. |
| 6,729,676 B1 | 5/2004 | O'Hara et al. |
| 2004/0081777 A1 | 4/2004 | Williams et al. |
| 2009/0311506 A1 | 12/2009 | Herbeck et al. |
| 2010/0116407 A1* | 5/2010 | Brentrup ............... B29C 70/506 156/62.4 |
| 2010/0174031 A1 | 7/2010 | Marks et al. |
| 2012/0108124 A1 | 5/2012 | Elia et al. |
| 2013/0317161 A1* | 11/2013 | Konagai ................. B29C 70/12 524/495 |
| 2014/0199551 A1 | 7/2014 | Lewit |

FOREIGN PATENT DOCUMENTS

| | | |
|---|---|---|
| DE | 102009056581 A1 | 6/2010 |
| EP | 0254806 A2 | 2/1988 |
| EP | 2586585 A1 | 5/2013 |
| FR | 2967371 A1 | 5/2012 |
| GB | 966855 A | 8/1964 |
| WO | 9835086 A1 | 8/1998 |
| WO | WO2012105080 A1 * | 8/2012 |
| WO | 2013103999 A1 | 7/2013 |

OTHER PUBLICATIONS

Extended European Search Report dated Mar. 28, 2017 for European Application No. 14840253.0 filed Sep. 2, 2014.

* cited by examiner

*Primary Examiner* — Robert Jones, Jr.
(74) *Attorney, Agent, or Firm* — Avery N. Goldstein; Blue Filament Law PLLC

(57) ABSTRACT

A process is provided for overmolding an insert or substrate with non-oriented thermoplastic fibers present in an amount that allows them to thermally bond in the presence of non-oriented filler fibers. The thermoplastic fiber fusion retains the filler fibers within the insert upon cooling. The filler fibers are selected to modify the properties of the insert and an overmolded article formed with the insert therein. Such overmolded articles are used in applications including vehicle components such as automotive interior light bases, posts, undercar components, cross members, chassis components, and frame components; architectural components such as home door interiors, sound damping panels, and weather resistant wood replacement. Articles formed with the inventive process yield weight reductions compared to conventional insert overmoldings, along with low scrap generation, process flexibility with respect to part shape and fiber material. Improved recyclability and reduce costs are realized with the inclusion of natural fiber fillers.

19 Claims, 2 Drawing Sheets

OVERMOLDING WITH NON-ORIENTED FIBERS

RELATED APPLICATIONS

This application claims priority benefit of U.S. Provisional Application Ser. No. 61/872,059 filed Aug. 30, 2013; the contents of which are hereby incorporated by reference.

FIELD OF THE INVENTION

The present invention in general relates to overmolding and, more particularly, to a process for overmolding with a non-oriented thermoplastic fiber form reinforced with non-type of non-oriented fibers.

BACKGROUND OF THE INVENTION

Overmolding is a process where a melt processible material is molded directly into a rigid component, known as an insert or substrate. Melt processible materials typically used in overmolding include elastomers and thermoplastics. The major overmolding processes includes insert molding and two-shot molding. Materials are usually chosen specifically to bond together, using the heat from the injection of the second material to form that bond that avoids the use of adhesives or assembly of the completed part, and results in a robust multi-material part with a high quality finish. Reinforcing Fiber prepreg materials are then in thermoplastic, that is then heated to above the thermoplastics meting point and then put in a steel mold to conform to a mold platen shape. Unfortunately, the cutting and lay-up work with such sheets are unfavorable in terms of production cost and throughput.

Insert overmolding also has met with limited acceptance in instances where there is a desire to adjust the insert properties owing to the finite grades of thermoplastic woven fibers available. While custom weaves to include fibers that vary in properties are readily produced, a custom process necessary increases lead time for production and has limited value in tuning properties as the variations available in fiber thickness and fiber count per unit area.

While non-woven thermoplastic fibers and even chopped, non-oriented thermoplastic fibers afford benefits in terms of material cost, any benefit is overshadowed by the reduced insert strength and does little to tune the insert property of density.

Thus, there exists a need for process for insert overmolding that overcomes the limitations associated with heat forming of woven thermoplastic fibers. There further exists a need to achieve insert thermal formation from non-oriented thermoplastic fibers to achieve a wide range of insert properties.

SUMMARY OF THE INVENTION

An overmolding insert including: at least 25 total fiber weight percent of a plurality of non-oriented thermoplastic fibers having an average fiber length and average fiber diameter having on average at least 1.3 fusion bonds per thermoplastic fiber of the plurality of non-oriented thermoplastic fibers to other of the plurality of non-oriented thermoplastic fibers to define a shape of the overmolding insert; and a plurality of filler fibers intermixed with the plurality of non-oriented thermoplastic fibers.

A process of forming an overmolding insert including: mixing filler fibers and thermoplastic fibers to form a fiber mixture with at least 25 total fiber weight percent being the thermoplastic fibers; contacting the fiber mixture with a mold surface; heating the fiber mixture to fuse the thermoplastic fibers to one another to form a fused matrix; and cooling the fused matrix to form the overmolding insert with a shape defined by the mold surface.

BRIEF DESCRIPTION OF THE DRAWINGS

The present invention is further detailed with respect to the following drawings that are intended to show certain aspects of the present invention, but should not be construed as a limit on the practice of the present invention.

DETAILED DESCRIPTION OF THE INVENTION

Figure 1:
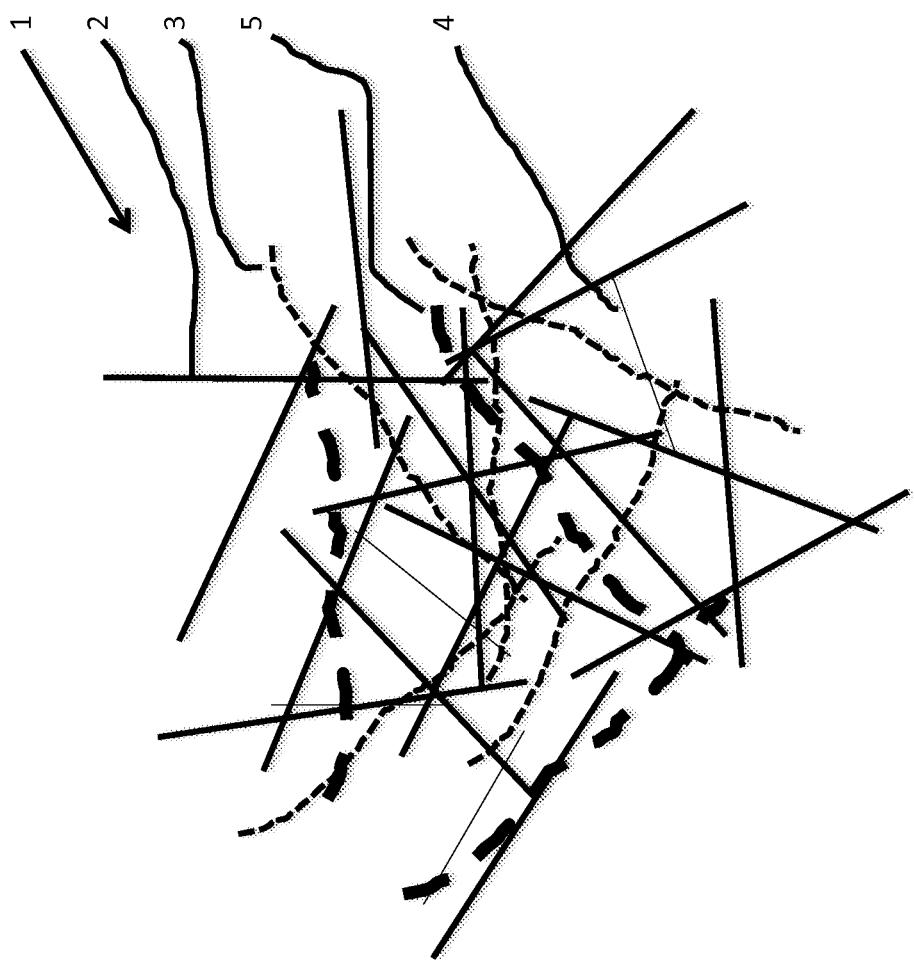
FIG. 1 is a schematic depicting a region of thermoplastic non-oriented fibers intermixed with filler fibers according the present invention.

The present invention has utility as a process for overmolding an insert or substrate with non-oriented thermoplastic fibers present in an amount that allows them to thermally bond in the presence of non-oriented filler fibers. The thermoplastic fiber fusion retains the filler fibers within the insert upon cooling. The filler fibers are selected to modify the properties of the insert and an overmolded article formed with the insert therein.

Such overmolded articles are used in a variety of applications illustratively including vehicle components such as automotive interior light bases, posts, undercar components, cross members, chassis components, and frame components; architectural components such as home door interiors, sound damping panels, and weather resistant wood replacement. Articles formed with the inventive process yield weight reductions compared to conventional insert overmoldings. The present invention has the attributes of low scrap generation, process flexibility with respect to part shape and fiber material. Embodiments of the present invention improve recyclability and reduce costs with the inclusion of natural fiber fillers.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

In one embodiment of the present invention, non-woven thermoplastic fibers are thermally bonded in a contoured shape of a mold that upon cooling defines an insert. Thermoplastic fibers operative herein illustratively include polyethylene, polypropylene, polyamides, polyimides, polyether ether ketone (PEEK), polycarbonates, polyethylene terephthalate (PET), copolymers of any of the aforementioned, and mixtures of any of the aforementioned individual polymers or copolymers.

The thermoplastic fibers and filler fibers are either applied to a mold surface as a dry or as a slurry. It is appreciated that thermoplastic fibers and various filler fibers are applied sequentially to a mold surface or premixed to form a fiber mixture. A slurry, if present is formed that includes a source of fibers of a given diameter that have been cut to a predetermined length or a variety of lengths; the fibers being in a solvent along with additives. The additives including a dispersing agent, particulate fillers to promote drying, binders, or a combination thereof. An inventive slurry applied using a conventional preform system or used with an inventive centrifugal preform system.

A solvent for an inventive slurry is largely dictated only by handling properties and compatibility with mold form materials, fibers, and slurry additives. Solvents operative herein illustratively include water, $C_1$-$C_{12}$ alcohols, toluene, ($C_1$-$C_6$ alkyl)-$C_1$-$C_6$ esters, ($C_1$-$C_6$)$_2$C=O ketones, and miscible combinations thereof. In order to comply with limits on volatile organic content (VOC) and waste treatment, in certain inventive embodiments, the slurry is aqueous. As will be detailed hereafter, a self-contained slurry is also provided with solvent recycle thereby obviating concerns about solvent VOC content and handling.

Filler fibers operative in an inventive process include glass; carbon; and natural cellulosic fibers such as hemp, cane, bamboo, jute, straw, silk, straw, palm frond, coconut husk, coconut fiber; and combinations thereof. Typical lengths of filler fibers used in the present invention typically range from 0.5 to 5 centimeters (cm). It is appreciated that continuous, direction use of such filler fibers are also operative in the current invention. The diameters of filler fibers are appreciated to vary widely based on commercial sources with glass filler fibers having typical diameters of 0.03 to 0.5 millimeters (mm); carbon filler fibers having typical diameters of 0.005 to 0.1 mm; and natural filler fibers having typical diameters of 0.01 to 0.3 mm. It should be appreciated that fiber dimensions outside of the aforementioned typical ranges exist and are intended to be within the scope of the present invention.

In certain embodiments of the present invention, thermoplastic fibers make up at least 25 total weight percent of the fiber content and up to 100 total fiber weight percent. It is appreciated that continuous, direction use of such thermoplastic fibers are also operative in the current invention. Typical lengths of the thermoplastic fibers are between 0.5 and 10 cm. Typical diameters of the thermoplastic fibers are between 0.01 and 0.7 mm. In some embodiments thermoplastic fillers with an aspect ratio between longest dimension and shortest dimension of the thermoplastic filler of less than 10:1 is also used herein in combination with the thermoplastic fillers. It should be appreciated that the thermoplastic fibers must form a fusion bond with at least 1.3 other individual thermoplastic fibers based on a statistical average. In still other embodiments each thermoplastic fiber forms between 1.5 and 8.4 bonds to other thermoplastic fibers. It should be appreciated that small diameter and long length thermoplastic fibers have increased fusions bonds relative to thicker and shorter fibers for a given weight percentage of thermoplastic fibers.

The present invention affords particular advantages in terms of recycled content, strength, density, or a combination of such properties through the inclusion of fiber fillers. In certain embodiments carbon filler fiber represents 0 to 60 total fiber weight percent of the insert overmolding composition. In certain embodiments glass filler fiber represents 0 to 60 total fiber weight percent of the insert overmolding composition. In certain embodiments cellulosic filler fiber represents 0 to 10 total fiber weight percent of the insert overmolding composition.

In certain inventive embodiments, the filler fibers have a median length that is between 80 and 1000% of the average length of the thermoplastic fibers. In general, a fiber filler should have an intersection with a statistical average of at least 2.2 thermoplastic fibers in an insert produced according to the present invention. In other embodiments of the present invention, an inventive insert has a mean filler fiber length that is proportional to the reciprocal square root of the number of fusion bonds between thermoplastic fibers. Without intending to be bound by a particular theory, when the number of thermoplastic fiber bonds is comparatively low, longer fill fibers interweave between fusion points and create added mechanical stability to the fusion bonded and cooled insert produced according to the present invention.

In still other embodiments of the present invention, thermoplastic fibers constitute 30-85 total fiber weight percent with both quantities of glass, carbon, or both fiber fillers being present along with cellulosic fiber fillers also being present. In another particular embodiment, the glass and or carbon fiber fillers are present at a higher weight percentage than the cellulosic fibers.

FIG. 1 shows a schematic of fiber matrix produced according to the present invention generally at 1, in which each of the intersections of thermoplastic fibers 2 represents a fusion bond in a resulting insert. Glass fibers 3, carbon fibers 4, and cellulosic filler fibers 5 being present.

The use of hydrophobic fibers in a water based slurry is promoted in the present invention by inclusion of a dispersing agent that serves to debundle and otherwise create randomized and individual dispersed fibers include small molecules or monomers with a molecular weight of less than 500 atomic mass units and having the general formula $(R^1)_2$—C=N—$R^2$ or $R^3$-pyrrolidines, where R' in each instance is independently H, $C_1$-$C_6$ alkyl, $C_1$-$C_6$ alkenyl, and $C_1$-$C_6$ alkyl having a substituent, the substituent being H, OH, COOH, NH$_2$, NH $C_1$-$C_6$ alkyl or $R^1$ in both instances are contented to form a 5 or 6 member ring structure; $R^2$ is $C_1$-$C_6$ alkyl, OH, and $C_1$-$C_6$ alkyl having a substituent, the substituent being H, OH, COOH, NH$_2$, NH $C_1$-$C_6$ alkyl; or $R^1$ and $R^2$ combine to form a 5 or 6 member ring structure and $R^3$ is H, $C_1$-$C_6$ alkyl, $C_1$-$C_6$ carboxyl, $C_1$-$C_6$ hydroxyl, or $C_1$-$C_6$ NH$_2$. Exemplary molecular dispersing agent include imidazoline, guanidine, oximes, and proline. Exemplary polymeric dispersing agents include polymeric imidizolines such as those detailed in U.S. Pat. No. 3,288,707 including those based on a 2-vinyl imidazoline. A dispersing agent in typically present in a fully formulated slurry from 0.01 to 1 total weight percent.

A dispersing agent for fibers includes a conventional surfactant, or a colloidal particulate filler. Such particulate fillers illustratively include colloidal silica, calcium carbonate, mica, clays, and combinations thereof. Colloidal fillers typically have a diameter of between 2 and 20 times the diameter of the thermoplastic fibers present in the slurry. Without intending to be bound to a particular theory, colloidal filler with this size differential relative to fibers promotes retention of particles in the fiber mass.

To facilitate a rapid build in viscosity as the solvent is removed from an inventive slurry, a polymeric binder is provided in certain embodiments. The binder limits the ability of fibers to migrate under the forces of drying as water or other solvent is removed from slurry on a mold surface. Binders operative herein in aqueous based slurries illustratively include lignosulfonates; proteins such as albumin; polyethylene glycols and especially those with molecular weights of between 600 and 1000; polyvinyl alcohols, pectins, and alkylated celluloses, and combinations thereof. Binders for hydrophobic slurries illustratively include polyvinylpyrrolidones, polystyrenes, cellulosic fillers, and combinations thereof. A binder is typically present in an amount of up to 1 total weight percent of a slurry.

The slurry in some embodiments also includes also includes a filler that promotes rapid drying of the preform by thermal exposure. The thermal conductivity of conventional SMC is about 0.3 to 0.7 W/m-K; glass and natural fibers are also low thermal conductivity. High thermal conductivity fillers operative herein illustratively include carbon fibers with values of 8-70 W/m-K (pan) and 20-1000 W/m-K (pitch), AN 260 W/m-K, BN 300 W/m-K, graphite 600 W/m-K, or carbon black, alumina, or combinations thereof. It is appreciated that carbon fiber based slurries already have high thermal conductivity values and need not be added to slurries were these are the predominant fiber. Incorporating fillers with paramagnetic properties in the fiber matrix allows the preform to be heated rapidly by induction heating for rapid cure cycles and for improved fiber wet-out. The paramagnetic properties keeps preform from overheating above the Curie Temperature of the paramagnetic particle. Paramagnetic fillers of gadolinium and $CrO_2$ with Curie temperature of 292 and 386 Kelvin, respectively are used, each alone or in combination to promote self-limiting induction heating. High thermal conductivity fillers or paramagnetic fillers are present in an inventive slurry from 0.0001 to 5 total weight percent of the slurry.

The slurry in some embodiments also includes additional additives to facilitate slurry handling and storage. Such additional additives include chelating agents, antimicrobials, antifoaming agents, antistatic agents, and combinations thereof. Such additional additives, if present, a typically individually present in a slurry from 0.00001 to 0.1 total weight percent of the fully formulated slurry.

A lower density insert is also provided when the material includes hollow glass microsphere having an outer diameter of between 10 and 120 microns. Alternatively, other fillers such as thermoplastic particulate is interspersed with the fibers being deposited on the mold surface to create a large open volume network that facilitates overmolding thermoplastic penetration therein.

Figure 2:
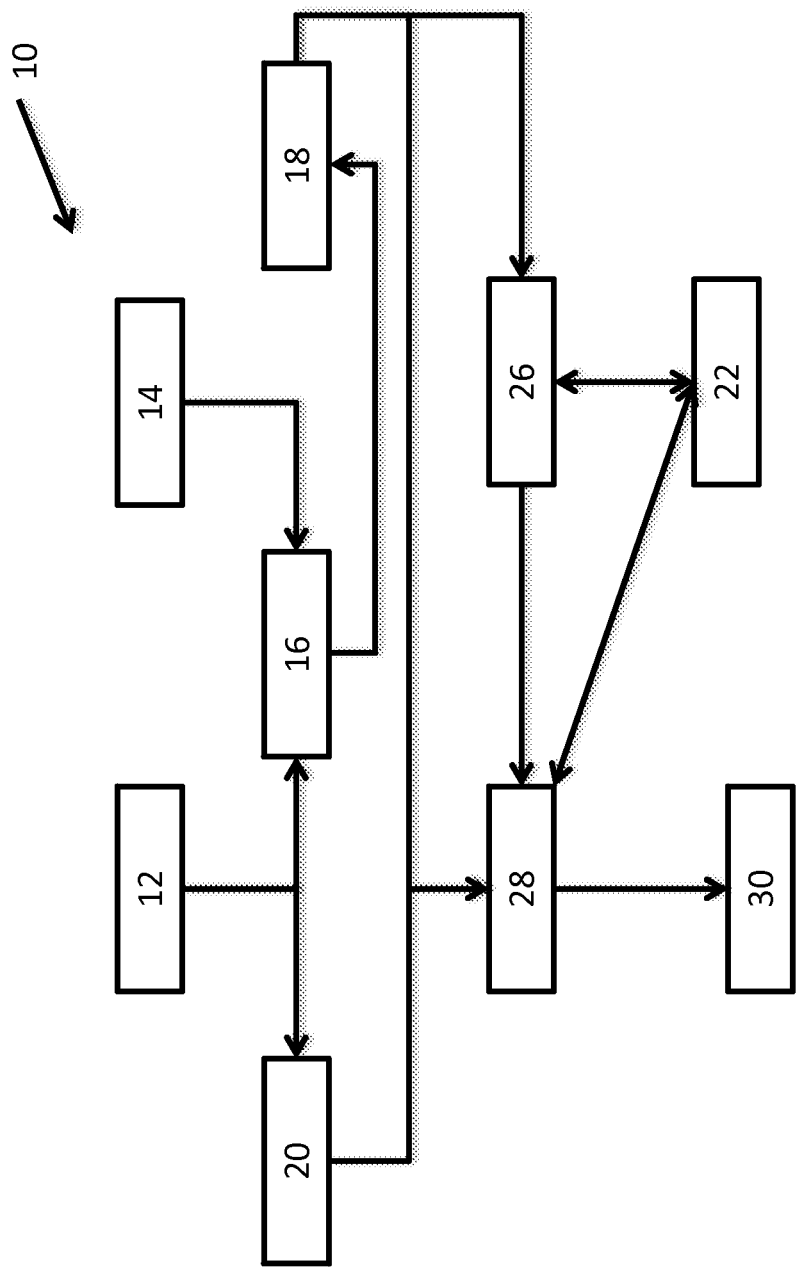
FIG. 2 is a schematic of the process for forming an overmolding insert according to an embodiment of the invention in the context of a complete overmolding process.

FIG. 2 shows a schematic of a process for forming a non-oriented thermoplastic fiber fused insert according to the present invention generally at 10 and using the same as a portion of an overmolded article. A supply of chopped filler fibers 12 and thermoplastic fibers 14 are combined to form a fiber mixture 16. It is appreciated that the supply of filler fibers can itself include separate source of fibers of from among glass, carbon, and cellulosic fibers with multiple types of a particular type of filler fibers that vary in length, diameter, composition, or a combination of such properties being present in other inventive embodiments. It should further be appreciated that additional additives as noted above are present in this mixture. The fiber mixture 16 is then slurried or transferred as a dry mass are heated at 18 either directly to contact with a mold surface such that upon heating fusion is achieved between thermoplastic fibers to afford an insert or to form pellets for subsequent injection molding at 20. The insert formed at step 18 is then compression molded at 26. In the event that the pellets are formed at step 20, these pellets are then used in the overmolding either alone or with other sources of thermoplastic at 28 to produce an article. In some inventive embodiments, information feedback is provided with computer aided engineering article design to optimize design and article properties. The article is finished through processes that illustratively include trimming, sanding, priming, painting, joining to other components, or a combination thereof at step 30.

The foregoing description is illustrative of particular embodiments of the invention, but is not meant to be a limitation upon the practice thereof. The following claims, including all equivalents thereof, are intended to define the scope of the invention.

The invention claimed is:

1. An overmolding insert comprising:
   at least 25 total fiber weight percent of a plurality of non-oriented thermoplastic fibers having an average fiber length and average fiber diameter, and having on average at least 1.3 fusion bonds per thermoplastic fiber of said plurality of non-oriented thermoplastic fibers to other of said plurality of non-oriented thermoplastic fibers to define a shape of the overmolding insert; and
   a plurality of filler fibers intermixed with said plurality of non-oriented thermoplastic fibers.

2. The insert of claim 1 wherein said plurality of plurality of filler fibers are glass.

3. The insert of claim 2 further comprising at least one of carbon fibers or natural cellulosic fibers.

4. The insert of claim 1 wherein said plurality of plurality of filler fibers are carbon.

5. The insert of claim 4 further comprising at least one of glass fibers or natural cellulosic fibers.

6. The insert of claim 1 wherein said plurality of plurality of filler fibers are natural cellulosics.

7. The insert of claim 1 further comprising a paramagnetic filler.

8. The insert of claim 1 further comprising at least filler of AlN, alumina, BN, carbon black or graphite.

9. The insert of claim 1 further comprising a binder.

10. The insert of claim 1 wherein there are on average between 1.5 and 8.4 fusion bonds per thermoplastic fiber of said plurality of non-oriented thermoplastic fibers to other of said plurality of non-oriented thermoplastic fibers.

11. The insert of claim 1 wherein said plurality of filler fibers have a median length that is between 80 and 1000% of the average length of said plurality of non-oriented thermoplastic fibers.

12. The insert of claim 1 wherein said plurality of filler fibers each have an intersection with a statistical average to at least 2.2 said plurality of non-oriented thermoplastic fibers.

13. A process of forming an overmolding insert comprising:
   mixing filler fibers and thermoplastic fibers to form a fiber mixture with at least 25 total fiber weight percent being said thermoplastic fibers;
   contacting said fiber mixture with a mold surface;
   heating said fiber mixture to fuse said thermoplastic fibers to one another to form a fused matrix, where said thermoplastic fibers have on average at least 1.3 fusion bonds per thermoplastic fiber; and
   cooling said fused matrix to form the overmolding insert with a shape defined by the mold surface.

14. The process of claim 13 further comprising transferring said fiber mixture as a dry mass into the contact with the mold surface.

15. The process of claim 13 further comprising transferring said fiber mixture as a slurry into the contact with the mold surface.

16. The process of claim 13 further comprising mixing at least two of glass fibers, carbon fibers, or cellulosic fibers together to form said filler fibers.

17. The process of claim 16 further comprising transferring said fiber mixture as a dry mass into the contact with the mold surface.

18. The process of claim 16 further comprising transferring said fiber mixture as a slurry into the contact with the mold surface.

19. The process of claim 13 wherein said thermoplastic fibers are non-oriented.

\* \* \* \* \*